US012781423B1

(12) United States Patent
Oast

(10) Patent No.: US 12,781,423 B1
(45) Date of Patent: Nov. 3, 2026

(54) CLOTHES DRYER FIRE EXTINGUISHING SYSTEM

(71) Applicant: Bradley Oast, Winston Salem, NC (US)

(72) Inventor: Bradley Oast, Winston Salem, NC (US)

( * ) Notice: Subject to any disclaimer, the term of this patent is extended or adjusted under 35 U.S.C. 154(b) by 538 days.

(21) Appl. No.: 18/241,951

(22) Filed: Sep. 4, 2023

(51) Int. Cl.

| | |
|---|---|
| ***D06F 58/50*** | (2020.01) |
| ***A62C 3/00*** | (2006.01) |
| ***D06F 37/36*** | (2006.01) |
| ***D06F 37/40*** | (2006.01) |
| *D06F 103/00* | (2020.01) |
| *D06F 105/00* | (2020.01) |

(52) U.S. Cl.
CPC ................ *D06F 58/50* (2020.02); *A62C 3/00* (2013.01); *D06F 2103/00* (2020.02); *D06F 2105/00* (2020.02)

(58) Field of Classification Search
CPC . D06F 58/50; D06F 37/42; A62C 3/00; A62C 37/36; A62C 37/40
USPC ............ 34/606, 62, 544, 524, 551, 434, 607
See application file for complete search history.

(56) References Cited

U.S. PATENT DOCUMENTS

| | | | | |
|---|---|---|---|---|
| 9,327,152 | B2 | 5/2016 | Dolton | |
| 9,356,706 | B2 | 5/2016 | Stolarczyk et al. | |
| 9,359,706 | B2 * | 6/2016 | Lundbom | D06F 29/02 |
| 11,141,614 | B2 * | 10/2021 | Fischer | A62C 3/16 |
| 2021/0111511 | A1 * | 4/2021 | Wines | H04B 1/3818 |

FOREIGN PATENT DOCUMENTS

| | | | |
|---|---|---|---|
| JP | H036313 Y2 * | 2/1991 | F26B 25/00 |

OTHER PUBLICATIONS

English JPH036313 by PE2E Feb. 20, 2026.*

* cited by examiner

*Primary Examiner* — Deming Wan
(74) *Attorney, Agent, or Firm* — Sanchelima & Associates, P.A.; Christian Sanchelima; Jesus Sanchelima

(57) ABSTRACT

A clothes dryer fire extinguishing system including a dispensing assembly and a control box assembly. The dispensing assembly includes extinguishers. The control box assembly includes a housing having a microcontroller having an integrated sensor and an electric switch therewithin. The microcontroller can actuate the extinguisher to dispense water and the electric switch to turn off a dryer when the integrated sensor detects a predetermined temperature in the dryer. The dryer is connected to the switch to a power supply. The housing has magnets to be attached to the dryer.

10 Claims, 5 Drawing Sheets

CLOTHES DRYER FIRE EXTINGUISHING SYSTEM

BACKGROUND OF THE INVENTION

1. Field of the Invention

The present invention relates to a clothes dryer fire extinguishing system and, more particularly, to a clothes dryer fire extinguishing system that is capable of detecting heat to determine whether a fire exists and automatically set off the water and turn off the power of the clothes dryer so no one will get shocked.

2. Description of the Related Art

Several designs for fire extinguishing systems have been designed in the past. None of them, however, include a fire extinguishing system which can be installed in dryers to prevent fires, use the waterline thereof and turn off the dryer if a high temperature is detected.

Applicant believes that a related reference corresponds to U.S. Pat. No. 9,356,706 issued for a fire containment system which is implemented in a combination washer-dryer appliance equipped with air-vented exhaust. Applicant believes that another related reference corresponds to U.S. Pat. No. 9,327,152 issued for a fire extinguisher system comprising a conduit and at least one storage, with at least one valve connected to the at least one storage responsive to a heat event within the conduit. None of these references, however, teach of a clothes dryer fire detection and extinguishing system comprising a temperature sensor which is connected to a power cut off device, and a water dispensing, where the system is attached to the appliance with magnets.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a clothes dryer fire extinguishing system which has such a structure that permits it to be placed behind the clothes dryer without the need of moving the clothes dryer.

It is another object of this invention to provide a clothes dryer fire extinguishing system that includes water dispensers to dispense water from the water line directed to the clothes dryer in case of fire or high temperature.

It is still another object of the present invention to provide a clothes dryer fire extinguishing system that includes a control box having a light alarm to indicate high temperature detection and a magnets to be fixed to the back of the clothes dryer.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
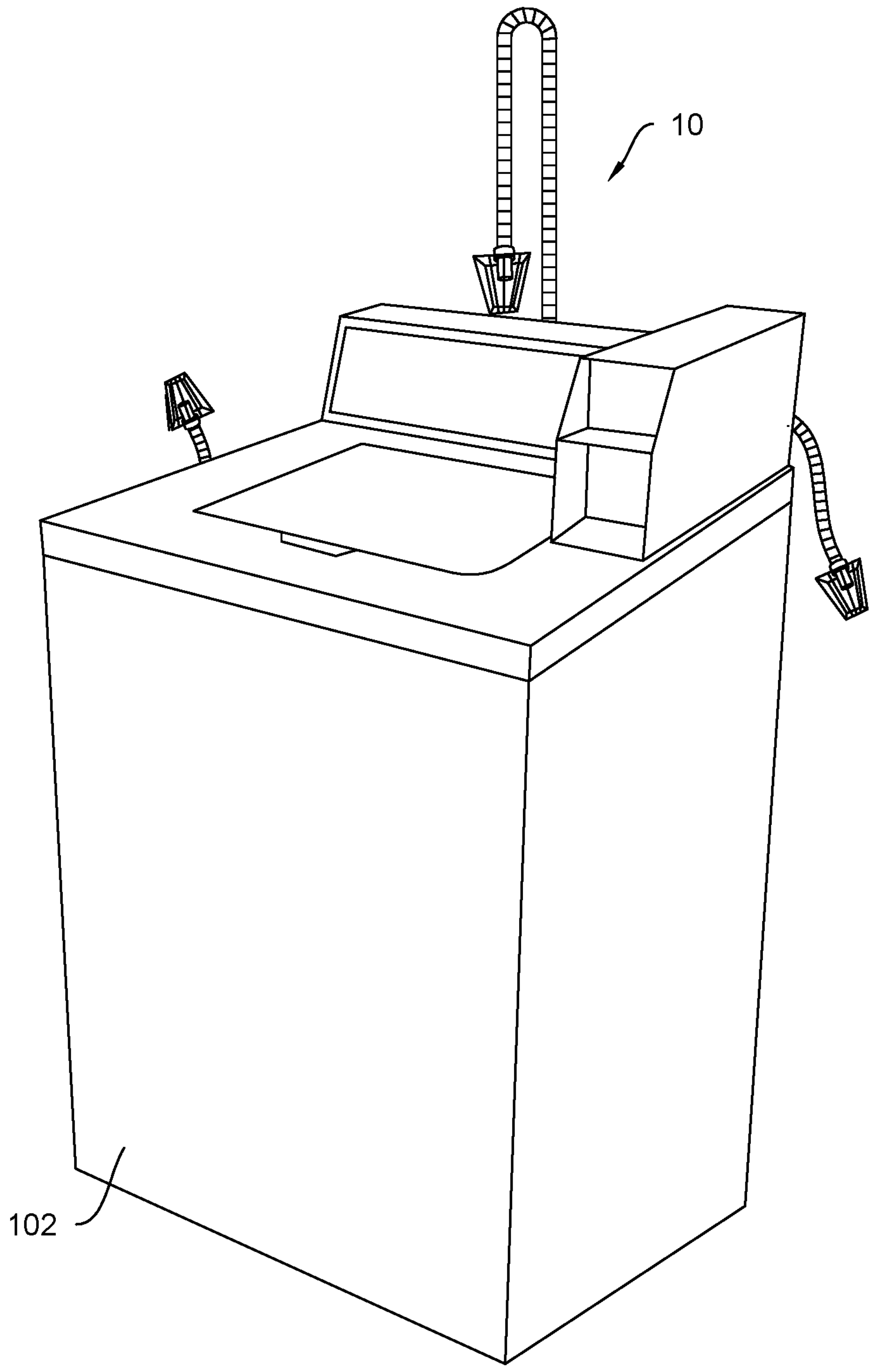
FIG. 1 represents an isometric operational view of the present invention 10.

Referring now to the drawings, where the present invention is generally referred to with numeral 10, it can be observed that it basically includes dispensing assembly 20 and a control box assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The dispensing assembly 20 may include a central tube 22, a base 27, a solenoid 23, a waterline hose 26, a vent hose 25, a cable 24, a flow switch 26*a* and extinguishers 21. The base 27 may have a circular shape. It also may be suitable for the base 27 to have a rectangular shape, a triangular shape, or any other suitable shape. The base 27 may preferably be made of stainless steel. It also may be suitable for the base 27 to be made of aluminum, iron, polyvinyl chloride, or any other suitable material.

The central tube 22 may be perpendicularly attached to the base 27. The base 27 may provide support to the dispensing assembly. The central tube 22 may be hollow. The central tube 22 may preferably be made of stainless steel. It also may be suitable for the central tube 22 to be made of polyvinyl chloride, aluminum, or any other suitable material. The central tube 22 may have a cylindrical shape. It also may be suitable for the central tube 22 to have a rectangular shape, a triangular shape, or any other suitable shape. The central tube 22 may present different connections which may fluidically connect the extinguishers 21 thereto.

Figure 2:
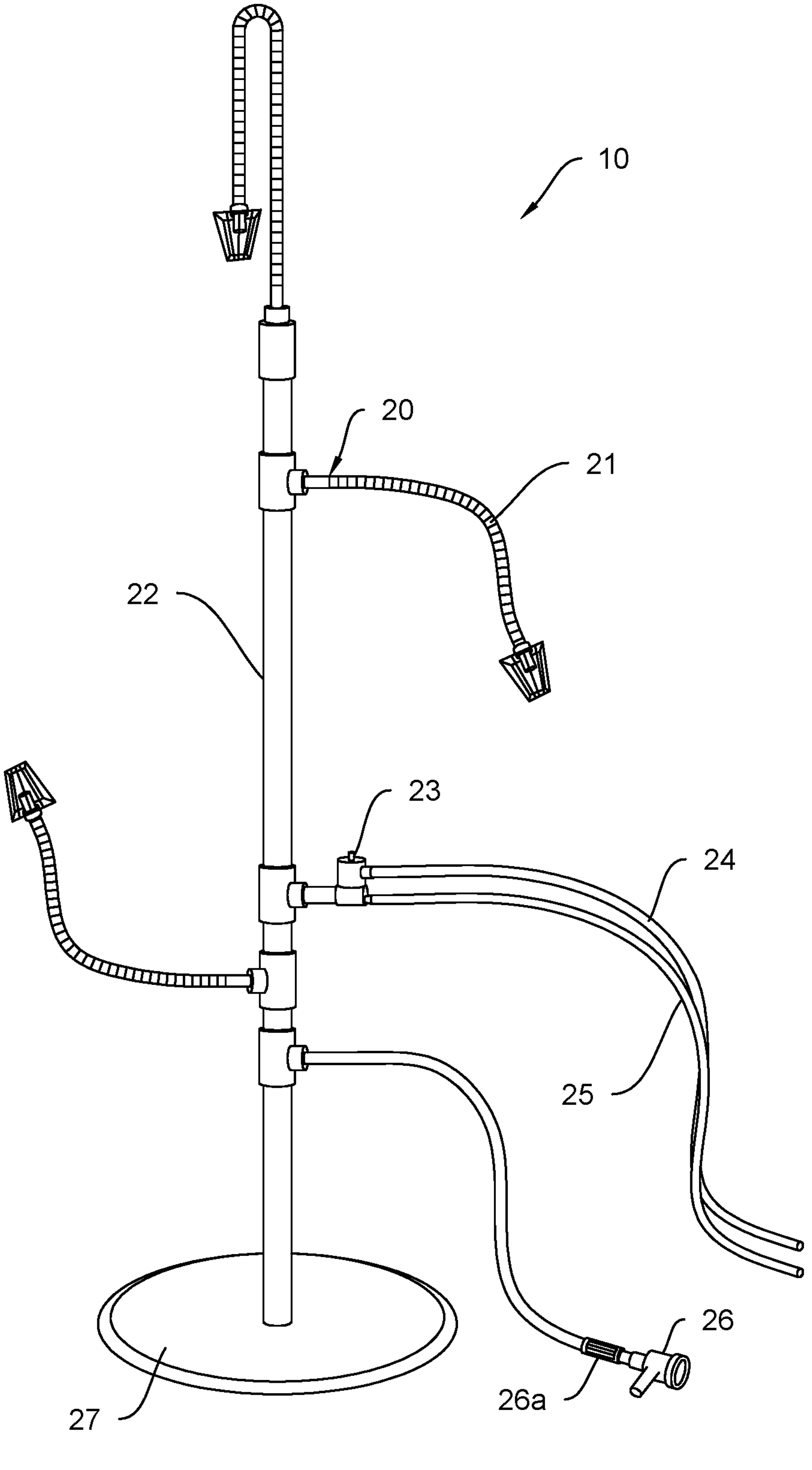
FIG. 2 shows an isometric view of the dispensing assembly 20.

The extinguishers 21 may include a movable hose and an extinguisher nozzle. The movable hose may be made of reinforced plastic with metallic portions. The movable hose may be operated to adjust the direction thereof. The movable hose may be hollow and have the extinguisher nozzle in a distal end thereof. The extinguishers 21 may be fluidically connected to the central tube 22. FIG. 2 may illustrate three extinguishers 21 which are selectively positioned to extinguish fire in a dryer. It should be understood that the present invention includes but is not limited to three extinguishers 21. In some embodiments the extinguishers 21 may protrude from the sidewalls of the central tube 22 perpendicularly thereto and also from a top end thereof.

The waterline hose 26 may be fluidically connected to the central tube 22. The waterline hose 26 may have a proximal end and a distal end. The proximal end of the waterline hose 26 may be connected to a waterline intake to be provided with water. It should be understood that the waterline hose 26 may include connectors that permit coupling the waterline hose 26 to water line intakes. The waterline hose 26 may have the flow switch 26*a* in a portion thereof between the proximal end and the distal end thereof. The flow switch 26 may be electrically connected to the control box assembly 40. The flow switch 26 may permit or prevent the flow of water therethrough when energized or deenergized, respectively. The flow switch 26 may be energized when a predetermined temperature is detected by the control box assembly. The flow switch 26 may permit waterflow from the water flow intake to be dispensed to the extinguishers 21 through the central tube 22 when a predetermined temperature is detected by the control box assembly 40.

The solenoid 23 may also be connected to a portion of the central tube 22. The solenoid 23 may be fluidically connected to the central tube 22. The solenoid 23 may have three connections: from a left side the solenoid 23 may be connected to the central tube 22 and by a right side the solenoid 23 may have an electrical connection through the cable 24 and a fluidical connection through the vent hose 25. In a preferred embodiment the solenoid 23 may be a solenoid switch. The vent hose 25 may be connected or deposited into a dryer vent hose (not shown in the drawings). The vent connection 25 may allow dispensing water through the vent hose of the dryer 102 when water flows through the central tube 22. The cable 24 may be connected to the control box assembly 40. The cable 24 may be electrically connected to the control box assembly 40 to turn off the dryer. The cable 24 may connect the solenoid 23 with the control box assembly 40.

Figure 3:
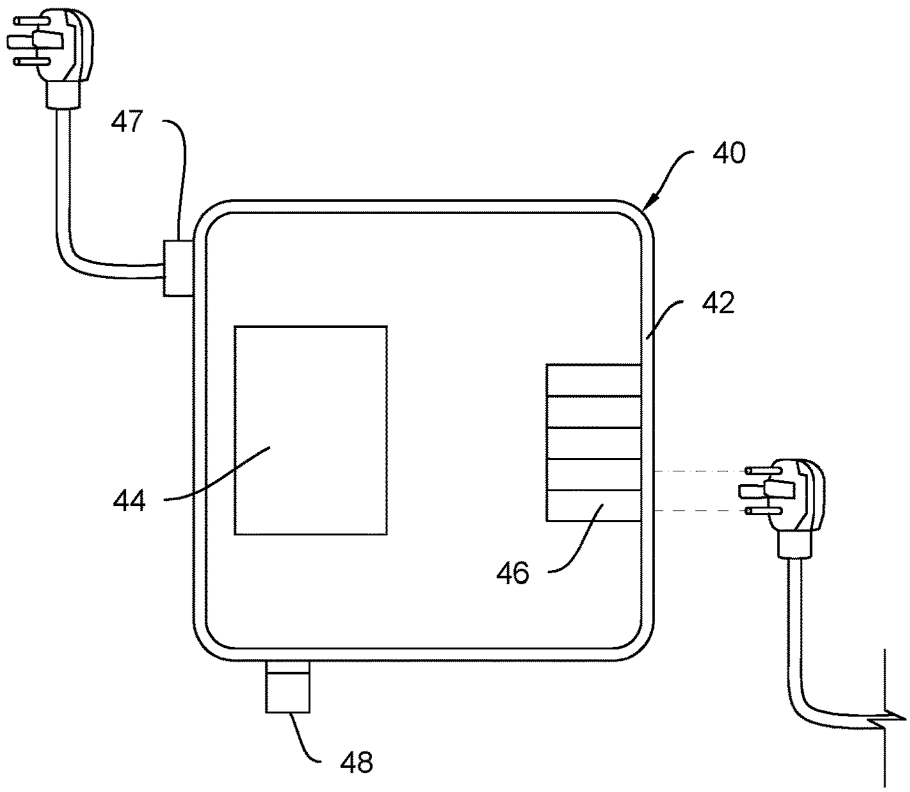
FIG. 3 illustrates a schematic view of the control box assembly 40.
Figure 4:
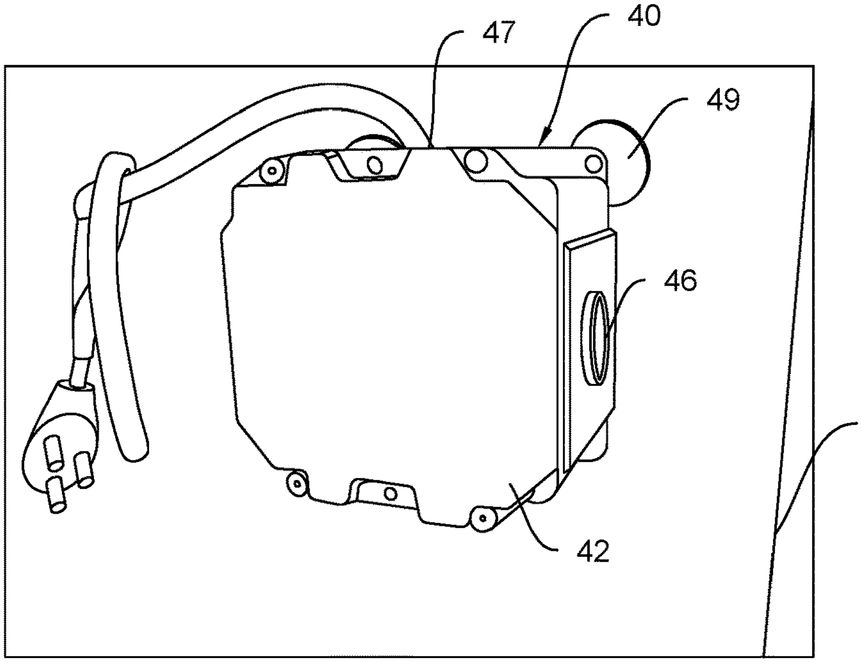
FIG. 4 is a representation of an isometric operational view of the control box assembly 40 attached to the rear wall of cloth dryer 102.

Referring now to FIG. 3 and FIG. 4 it can be observed that the control box assembly 40 basically includes a housing 42, magnets 49, an alarm indicator light 48, a microcontroller 44 having an integrated sensor, a CNC connector 46 and an inlet connection 47. The housing 42 may substantially have a rectangular shape with rounded corners. It also may be suitable for the housing 42 to have a cylindrical shape, a triangular shape, or any other suitable shape. The housing 42 may preferably be made of stainless steel. It also may be suitable for the housing 42 to be made of polyvinyl chloride, polyurethane, aluminum, iron, or any other suitable material. The housing 42 may be hollow. The housing 42 may include electronic circuitry therein. The housing 42 may be attached to a rear wall of a dryer 102 through the magnets 49. Magnets 49 may be located at the four corners of a front wall or rear wall of the housing 42.

The inlet connection 47 may include a power cord which is connected to a power source to provide power to the control box assembly 40. The CNC connector 46 may be electrically connected to the inlet connection 47 and the solenoid 23. The solenoid 23 may detect a water flow through the central tube 22 and turn off the the CNC connector so the dryer 102 may not have a connection to electric power. The dryer 102 may be connected to the CNC connector 46.

The microcontroller 44 may actuate the flow switch 26*a* to permit waterflow therethrough if a predetermined temperature is detected. The microcontroller 44 may have an integrated sensor which detects temperature. In a preferred embodiment the predetermined temperature is 165 Fahrenheit degrees. When integrated sensor detects the predetermined temperature or above then the microcontroller 44 may actuate the flow switch 26*a* so water can be dispensed through the extinguishers 21 and actuate the indicator light 48. The indicator light 48 may turn on and blink to show that a predetermined temperature exists. The solenoid 23 may detect the water flow through the central tube 22 and turn off the CNC connector 46 so the dryer 102 is turned off.

Figure 5:
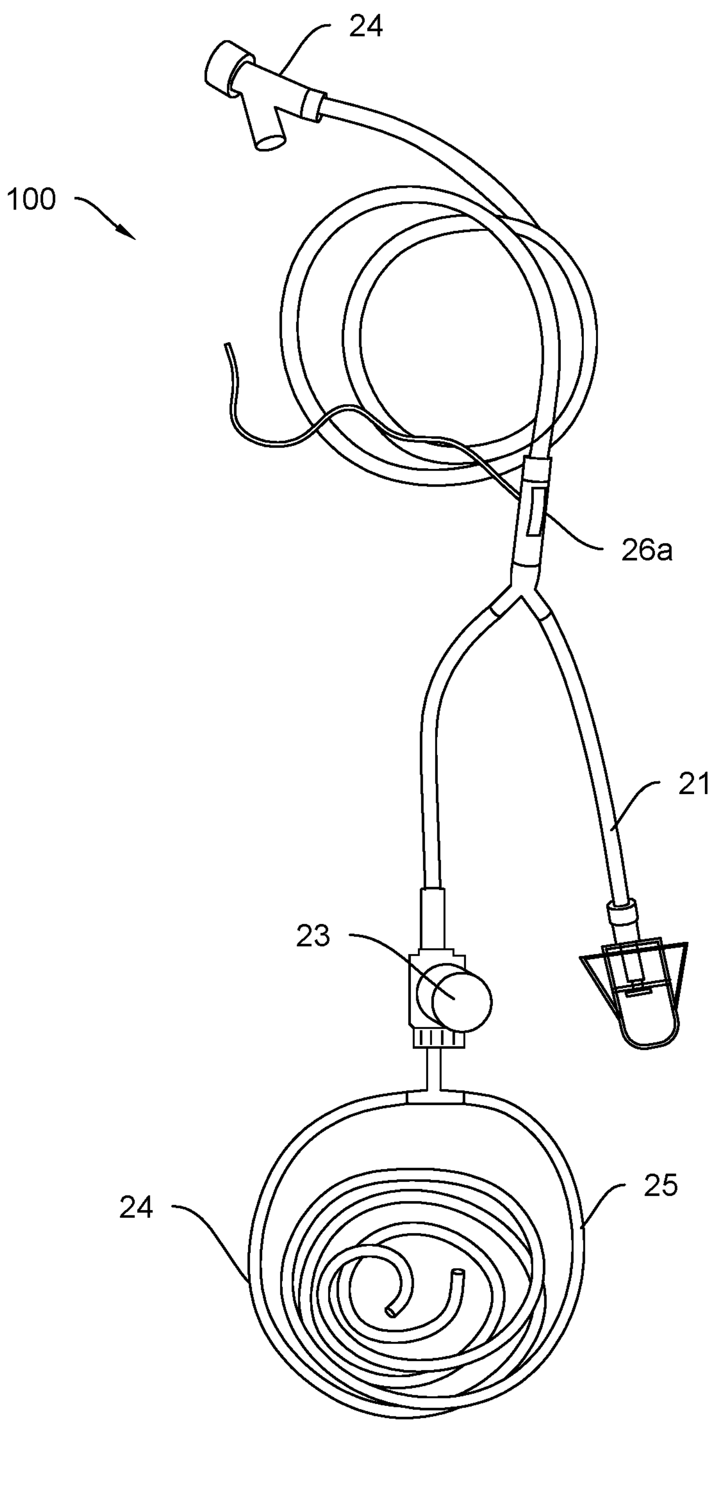
FIG. 5 depicts an alternative embodiment 100 of the present invention.

As best illustrated in FIG. 5, an alternative embodiment 100 may include no central tube 22 nor base 27. The alternative embodiment 100 may be used for home dryers. The alternative embodiment 100 may strictly include an extinguisher 21.

Figure 5A:
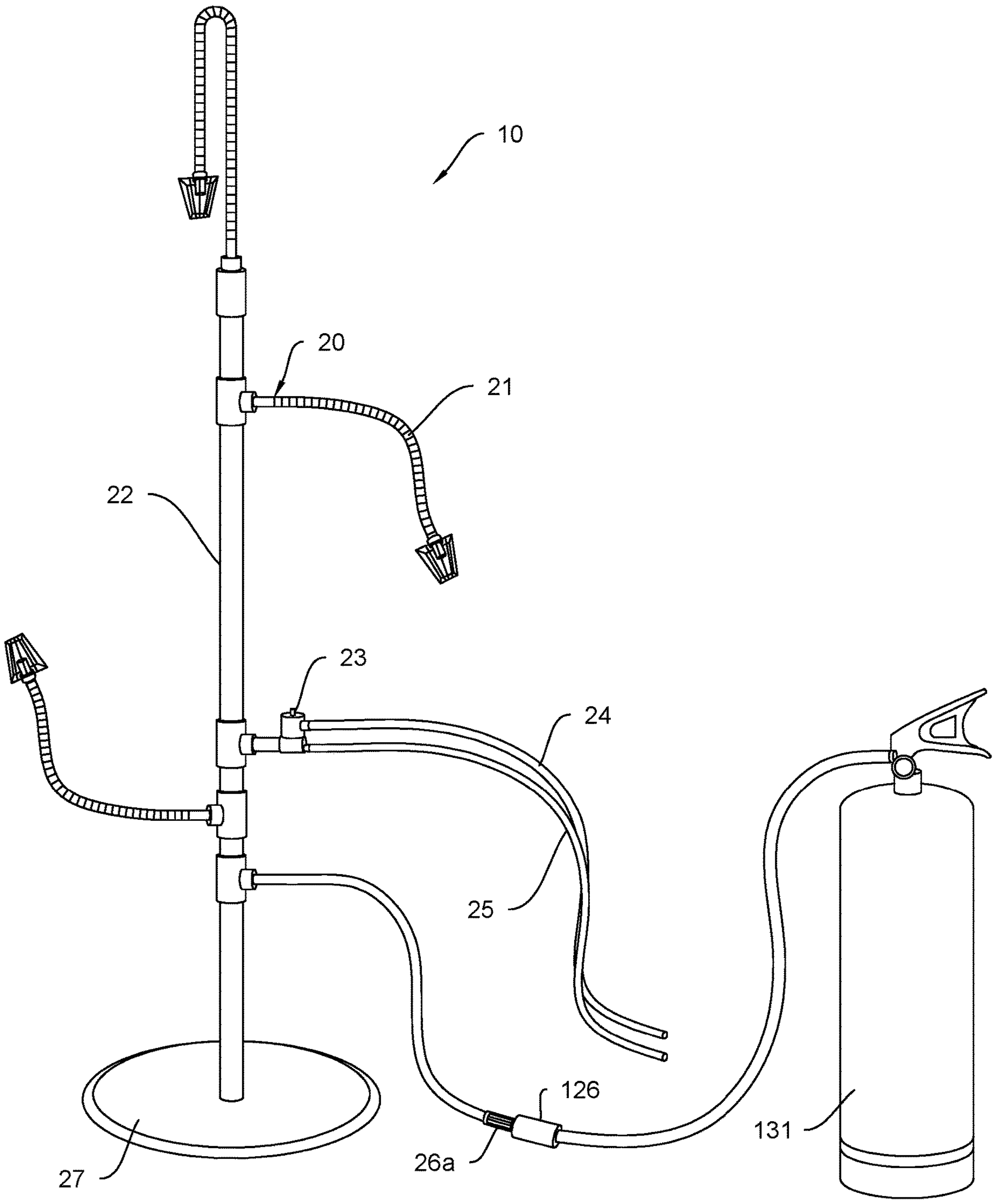
FIG. 5A is an illustration of an isometric operational view of the present invention 10 connected to extinguisher 131.

In a preferred embodiment the present invention 10 may be connected to the water intake. It also may be suitable for the present invention 10 to be connected to an extinguisher 131 as best illustrated in FIG. 5A, where the extinguisher 131 may be loaded to extinguish the fire when a predetermined temperature is reached. It should be understood that either alternative embodiment of FIG. 5 or preferred embodiment of FIG. 2 may be connected extinguisher 131. It should be noted that adapter 126 may be used to connect the present invention with extinguisher 131.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A clothes dryer fire extinguishing system, comprising:

a dispensing assembly, wherein said dispensing assembly includes a central tube, a base, extinguishers fluidically connected to said central tube, a waterline hose fluidically connected to said central tube, and a solenoid fluidically connected to said central tube, said solenoid having an electrical connection through a cable and a fluidical connection through a vent hose configured to be deposited into a dryer vent hose; and a control box assembly, wherein said control box assembly includes a housing having a microcontroller having an integrated sensor and an electric switch, wherein said microcontroller is configured to actuate said extinguishers to dispense water and said electric switch to turn off a dryer when said integrated sensor detects a predetermined temperature, said dryer being connected to said electric switch, said electric switch connected to a power supply, said housing having magnets to be attached to a metal surface, wherein said cable from said solenoid is electrically connected to said control box assembly, and wherein said solenoid is configured to detect a flow of water through said central tube and, upon detection of said water flow, to actuate said electric switch to automatically turn off said dryer.

2. The clothes dryer fire extinguishing system set forth in claim 1, wherein said dispensing assembly includes said base and said central tube perpendicularly attached thereto.

3. The clothes dryer fire extinguishing system set forth in claim 2, wherein said central tube is hollow, said central tube having said extinguishers protruding therefrom.

4. The clothes dryer fire extinguishing system set forth in claim 2, wherein said central tube includes a waterline hose, said waterline hose includes a flow switch, wherein said waterline hose is connected to a waterline intake, wherein said flow switch is electrically connected to said microcontroller, said microcontroller energizes said switch flow to permit water go through when said predetermined temperature is reached.

5. The clothes dryer fire extinguishing system set forth in claim 1, wherein said predetermined temperature is 165 fahrenheit degrees or above.

6. The clothes dryer fire extinguishing system set forth in claim 2, wherein said central tube includes said solenoid connected thereto, said solenoid detects a flow through said central tube to activate said electric switch to turn off said dryer.

7. The clothes dryer fire extinguishing system set forth in claim 1, wherein said electric switch is a Computer Numerical Control device.

8. The clothes dryer fire extinguishing system set forth in claim 1, wherein said extinguishers include a movable hose and an extinguisher nozzle.

9. A clothes dryer fire extinguishing system, comprising: a dispensing assembly, wherein said dispensing assembly includes a base having a central tube protruding perpendicularly thereof, said central tube being hollow, said central tube including extinguishers protruding therefrom and a waterline hose fluidically connected thereto, said waterline hose includes a flow switch, wherein said waterline hose is connected to a waterline intake, wherein said extinguishers include a movable hose and an extinguisher nozzle; and a control box assembly, wherein said control box assembly includes a housing having microcontroller having an integrated sensor and an electric switch, wherein said flow switch is electrically connected to said microcontroller, said microcontroller energizes said switch flow to permit water go through said central tube and be dispensed by said extinguishers when a predetermined temperature is reached in a dryer, wherein said microcontroller is configured to turn off said dryer when said integrated sensor detects said predetermined temperature, said dryer being connected to said electric switch, said electric switch connected to a power supply, said housing having magnets to be attached to said dryer.

10. A clothes dryer fire extinguishing system, consisting of: a dispensing assembly, wherein said dispensing assembly includes a base having a central tube protruding perpendicularly thereof, said central tube being hollow, said central tube including extinguishers protruding therefrom, a solenoid and a waterline hose fluidically connected thereto, said waterline hose includes a flow switch, wherein said waterline hose is connected to a waterline intake, said solenoid; and a control box assembly, wherein said control box assembly includes a housing having microcontroller having an integrated sensor and an electric switch, wherein said flow switch is electrically connected to said microcontroller, said microcontroller energizes said switch flow to permit water go through said central tube and be dispensed by said extinguishers when a predetermined temperature is reached in a dryer, said solenoid detects a flow through said central tube to activate said electric switch to turn off said dryer when said integrated sensor detects said predetermined temperature, said dryer being connected to said electric switch, said electric switch connected to a power supply, said housing having magnets to be attached to said dryer, wherein said predetermined temperature is 165 fahrenheit degrees or above, wherein said electric switch is a Computer Numerical Control device.

* * * * *